United States Patent [19]
Bauer et al.

[11] 3,981,341
[45] Sept. 21, 1976

[54] SAFETY SUPPORT FOR PNEUMATIC TIRES

[75] Inventors: John R. Bauer, North Canton; Joseph M. Forney, Akron, both of Ohio

[73] Assignee: The Goodyear Tire & Rubber Company, Akron, Ohio

[22] Filed: May 19, 1975

[21] Appl. No.: 578,525

[52] U.S. Cl. ................................. 152/158
[51] Int. Cl.² ........................................ B60C 17/04
[58] Field of Search ........................... 152/152, 158

[56] References Cited
UNITED STATES PATENTS

| | | | |
|---|---|---|---|
| 1,251,077 | 12/1917 | Mayhew | 152/158 |
| 3,049,162 | 8/1962 | Rosenbaum et al. | 152/158 |
| 3,635,273 | 1/1972 | Patecell | 152/158 |
| 3,872,907 | 3/1975 | Curtiss et al. | 152/158 |

FOREIGN PATENTS OR APPLICATIONS 956,380  1/1957  Germany ........................... 152/158

*Primary Examiner*—Drayton E. Hoffman
*Attorney, Agent, or Firm*—F. W. Brunner; P. E. Milliken; Frederick K. Lacher

[57] ABSTRACT

A safety support for mounting on a rim inside a tire chamber to support the shoulder areas of the tire in a deflated condition. The support has a pair of spaced-apart rings with a diameter less than the diameter of the tread portion of the tire in the inflated condition and greater than the diameter of the tire beads for engaging the tire in the deflated condition. The rings are mounted on a pair of arms extending outwardly from a central disc-like annular supporting member having a radially inner edge in supported engagement with the rim.

4 Claims, 8 Drawing Figures

SAFETY SUPPORT FOR PNEUMATIC TIRES

This invention relates generally, as indicated, to a safety support for use on a wheel rim inside a tire chamber to support the tire in a deflated condition.

Heretofore different types of supports have been proposed for supporting tires in a deflated or run-flat condition. One of the problems with the use of these supports has been adapting them for use on drop center rims and especially for mounting the tires and the supports in the wheel wells of the rims. Another problem has been to provide sufficient resiliency of the supports to cushion the vehicle from damaging impact forces caused by irregularities in the road during operation of the deflated tire.

With the foregoing in mind it is the principal object of this invention to provide a safety support which is adaptable for mounting on a drop center type rim to permit mounting of tires on the rim.

Another object of the invention is to provide cushioning support of the vehicle when operated with the tire in the deflated or run-flat condition.

A further object is to provide space in the wheel well for the bead of the tire during mounting.

A still further object is to provide for ease of assembly and disassembly of the support during the mounting and dismounting of the tire.

These and other objects of the invention are provided by a central annular support mounted on the rim with a pair of spaced-apart rings positioned radially outward of the rim and radially inward of the tire tread in the inflated condition of the tire. The rings are connected to the central annular support by a pair of arm members which provide the necessary support to the rings and at the same time have the resiliency to cushion the wheel and vehicle during operation of the tire in the deflated condition.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but some of the various ways in which the principles of the invention may be employed.

Figure 1:
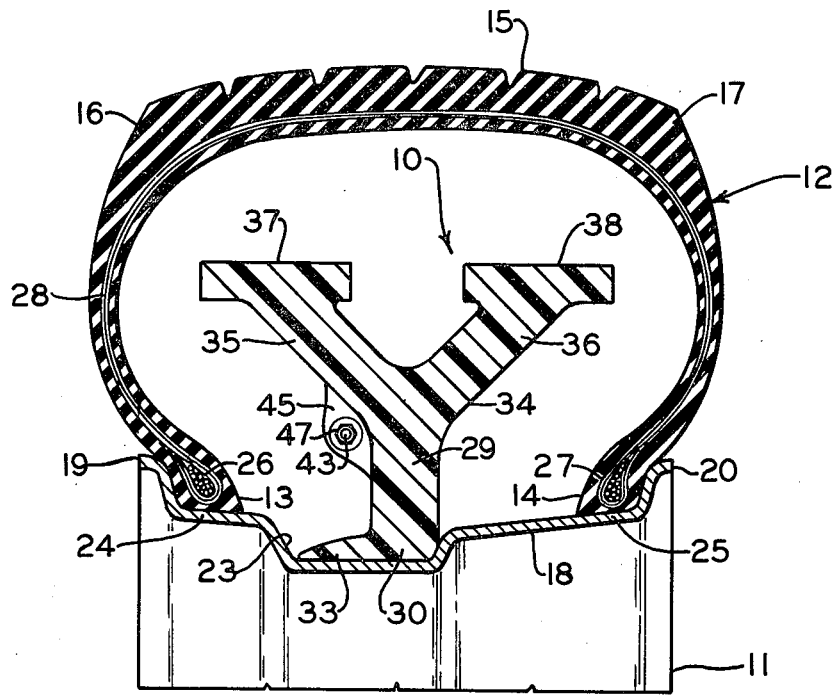
FIG. 1 is a cross-sectional view of a segmental safety support embodying the invention mounted in a wheel rim inside a tire chamber, the connection of the rim to the supporting wheel not being shown.

Referring to FIG. 1, an annular safety support assembly 10 is shown mounted on an annular rim 11. The rim 11 is part of a wheel of a type well known in the art but not shown in this drawing. A pneumatic tire 12 is mounted on the rim 11 and has a first bead portion 13 at one edge and a second bead portion 14 at the other edge. The tire 12 also has a tread portion 15 at the crown of the tire and shoulder portions 16 and 17 at the edges of the tread portion.

The rim 11 has a generally cylindrical portion 18 with a first side flange 19 at one side and a second side flange 20 at the other side. A circumferentially extending wheel well 23 is provided in the rim 11 adjacent the first side flange 19 for facilitating mounting of the tire 12. The first bead portion 13 is seated in a first bead seat flange 24 adjacent the first side flange 19 and the second bead portion 14 is seated in a second bead seat flange 25 adjacent the second side flange 20 of the rim 11.

The tire 12 is of a type which is inflatable without a tube and may be of a radial, bias belted or bias ply construction. As shown in FIG. 1, the first bead portion 13 has a circumferentially extending bead 26 and the second bead portion 14 has a circumferentially extending bead 27 around which plies 28 extend.

Figure 2:
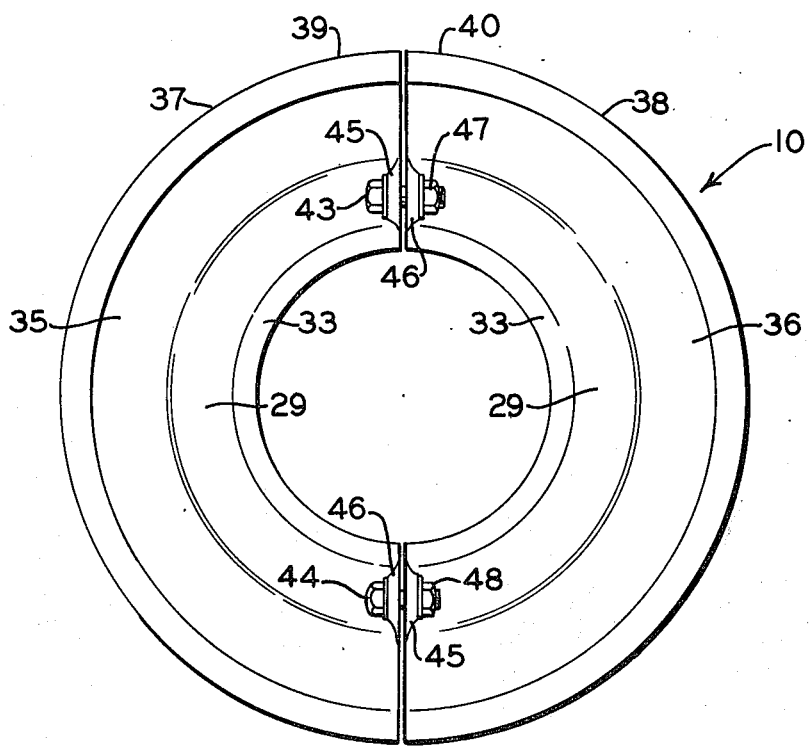
FIG. 2 is an elevation of the safety support showing the segments bolted together.

Referring to FIGS. 1 and 2, the safety support assembly 10 has an annular disc-like central supporting member or web 29 having a radially inner edge 30 for mounting at one side of the well 23. A mounting flange 33 extends axially from the radially inner edge 30 and has a width substantially equal to the width of the well 23 minus the width of the flange and not less than the width of bead portion 13 for mounting of the flange in the well.

The web 29 has a radially outer edge 34 with a pair of supporting arm members 35 and 36 extending outwardly at an angle from the web providing a bifurcated support assembly with a generally Y-shaped cross section, as shown in FIG. 1. Supporting rings 37 and 38 which are axially spaced apart are mounted on the arm members 35 and 36, respectively, and are positioned so that upon deflation of the tire 12 the rings will be in supporting engagement with the tire in the area of the shoulder portions 16 and 17. The supporting rings 37 and 38 have a diameter greater than the diameter of the bead portions 13 and 14 and a diameter less than the tread portion 15 in the inflated condition of the tire 12 so that during normal operation of the tire, the tread portion will not engage the supporting rings.

The safety support assembly 10 may be divided into curved segments such as two halves 39 and 40, each being made of a single unitary piece preferably of a material such a fiberglass reinforced plastic. Although halves 39 and 40 are shown in this embodiment, it is understood that the safety support assembly 10 may be divided into a greater number of curved segments to meet the balance and other requirements for assemblies of this type. The assembly 10 may be made of other materials if they have the required physical properties especially to provide radial deflection for cushioning the vehicle when the tire 12 is deflated and the tread portion 15 is in engagement with the rings 37 and 38.

The halves 39 and 40 may be fastened together by bolts 43 and 44 extending through lugs 45 and 46 at the ends of the halves and then clamped together around the rim 11 by nuts 47 and 48 threaded on the bolts.

In operation, upon deflation of the tire 12, the tread portion 15 will engage the rings 37 and 38 in the area of the shoulder portions 16 and 17 as the tire rotates under the weight of the vehicle. With the Y-shaped cross section of the assembly 10, the arm members 35 and 36 will be deflected radially inward towards the rim 11 and provide a cushioning effect which is highly desirable to mitigate the impact forces caused by irregularities in the road surface during operation of the deflated tire 12.

Figure 3:
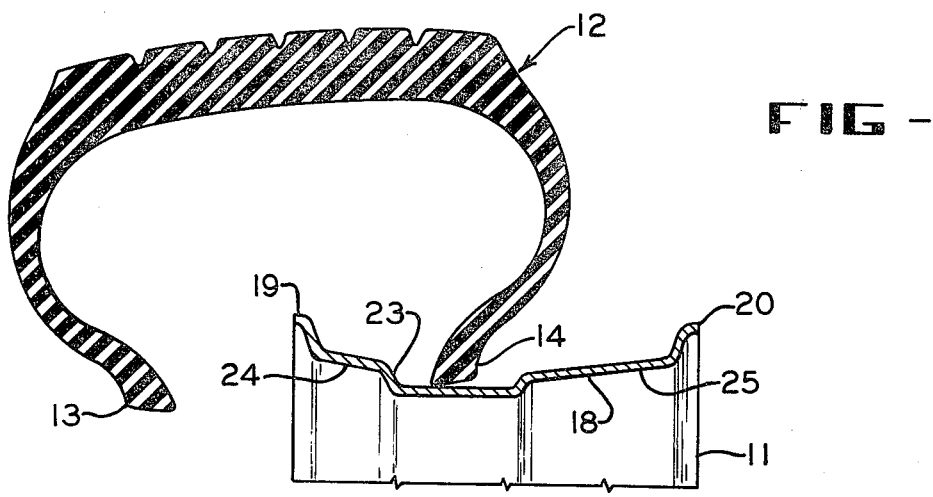
FIG. 3 is a schematic view like FIG. 1 showing the first step in mounting the tire on the rim.
Figure 4:
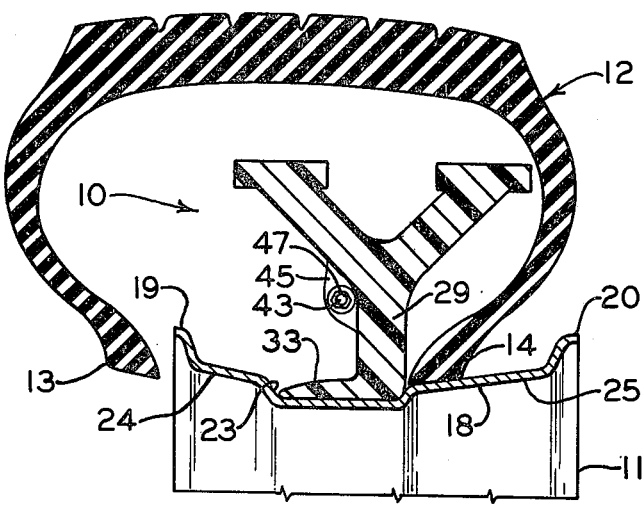
FIG. 4 is a fragmentary schematic view like FIG. 1 showing the next step in mounting the tire on the rim.
Figure 5:
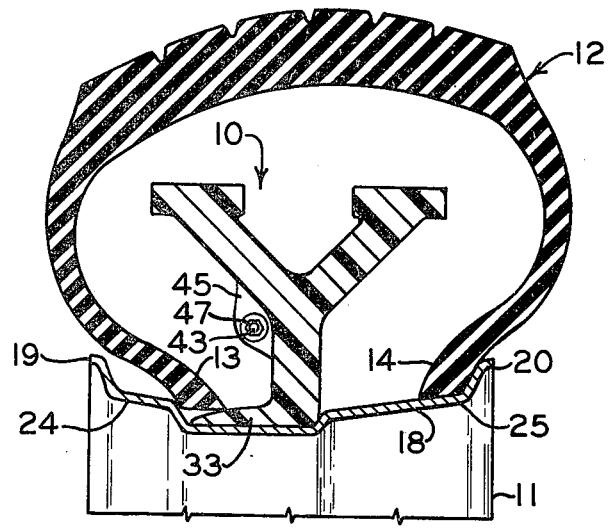
FIG. 5 is a view like FIG. 4 showing the mounting of the second bead over the rim flange.

To assemble the safety support assembly 10 and the tire 12 on rim 11 in the position shown in FIG. 1, the steps illustrated in FIGS. 3 through 5 may be followed. As shown in FIG. 3, a section of the second bead portion 14 of tire 12 has been placed in the wheel well 23 and the remainder of the bead portion pulled over the first side flange 19. In FIG. 4, the second bead portion 14 has been moved out of the well 23 and over the cylindrical portion 18 of the rim 11. The two halves 39 and 40 of the support assembly 10 have been placed in the well 23 with the mounting flange 33 closely fitting the surface of the well. Bolts 43 and 44 have been inserted through the lugs 45 and 46 and nuts 47 and 48 threaded on the bolts, as shown in FIG. 2, to clamp the assembly 10 around the rim 11 providing an annular support assembly securely mounted on the rim.

The next step shown in FIG. 5 illustrates the placing of a section of the first bead portion 13 in the well 23 so that the remainder of the bead portion can be pulled over the first side flange 19. The web 29 of the safety support assembly 10 is located at one side of the well 23 and the mounting flange 33 is relatively thin providing sufficient space in the well to accommodate a section of the first bead portion 13 and permit movement of the remainder of the first bead portion over the side flange 19 of rim 11. During this process, the second bead portion 14 may have moved into the second bead seat flange 25; however, if not, the second bead portion will be moved into that position in the final step of the assembly when the first bead portion 13 is moved into the first bead seat flange 24, as shown in FIG. 1, which may be done by spreading the bead portions in a manner well known in the art. Air is then introduced into the tire 12 and the pressure increased to the normal operating pressure for this tire. The valve for inflating the tire 12 is of a type well known in the art and is connected to the cylindrical portion 18 of the rim 11 with a valve stem (not shown) extending radially inward and axially outward from the cylindrical portion around the well 23. Disassembly of the tire 12 and safety support assembly 10 from the rim 11 may be accomplished by reversing the assembly process set forth hereinabove.

Figure 6:
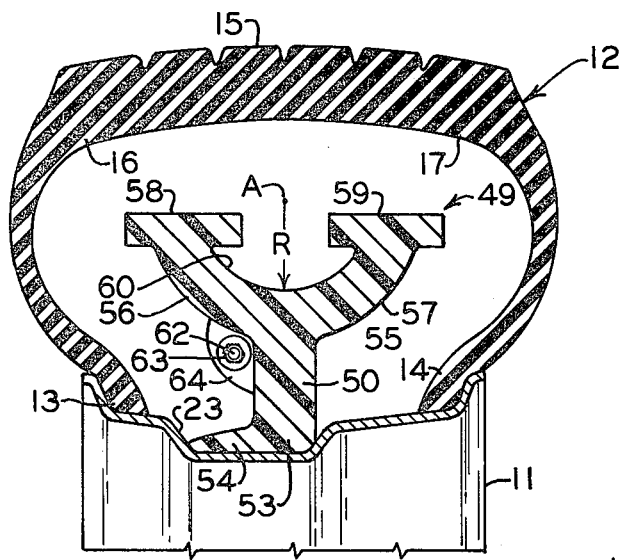
FIG. 6 is a schematic sectional view like FIG. 1 showing a modification of the safety support of the invention.

Referring to FIG. 6, a modification of the invention is shown and since the tire 12 and rim 11 are the same as that described for the embodiment of FIGS. 1 through 5, the same numerals will be used to identify these parts. A safety support assembly 49 has an annular central supporting member or web 50 with a radially inner edge 53. A mounting flange 54 extends axially from the inner edge 53 and has a width which is substantially the same as the width of the wheel well 23. The web 50 has a radially outer edge 55 from which curved arm members 56 and 57 extend in supporting relationship to tire supporting rings 58 and 59 which are located at spaced-apart positions axially of the assembly 49. The diameter of the rings 58 and 59 is less than the diameter of the tread portion 15 of the tire 12 in the inflated condition of the tire so that during normal operation the tread portion will not engage the rings. The diameter of the rings 58 and 59 is also greater than the diameter of the bead portions 13 and 14 of the tire 12. The rings 58 and 59 engage the tread portion 15 of the tire 12 in the area of the shoulder portions 16 and 17 during operation of the tire in the deflated condition.

The curved arms 56 and 57 are curved generally about a circumferentially extending axis A located between the rings 58 and 59 providing a circumferentially extending channel 60 with a generally semicircular cross section having a radius R as shown in FIG. 6. The assembly 49 may be divided in halves providing curved segments which may be fastened together by bolts 62 and nuts 63 extending through lugs 64 on the assembly 49 in a manner similar to that described for the embodiment of FIGS. 1 through 5.

Assembly and disassembly of the safety support assembly 49, rim 11 and tire 12 may be accomplished in the same manner as described for the embodiments of FIGS. 1 through 5 with special reference to FIGS. 3 through 5. Upon deflation of the tire 12, the tread 15 will engage the rings 58 and 59 at the areas of the shoulder portions 16 and 17 due to the weight of the vehicle and the curved arms 56 and 57 will be deflected to cushion the vehicle from the impacts on the tire caused by irregularities in the road surface.

Figure 7:
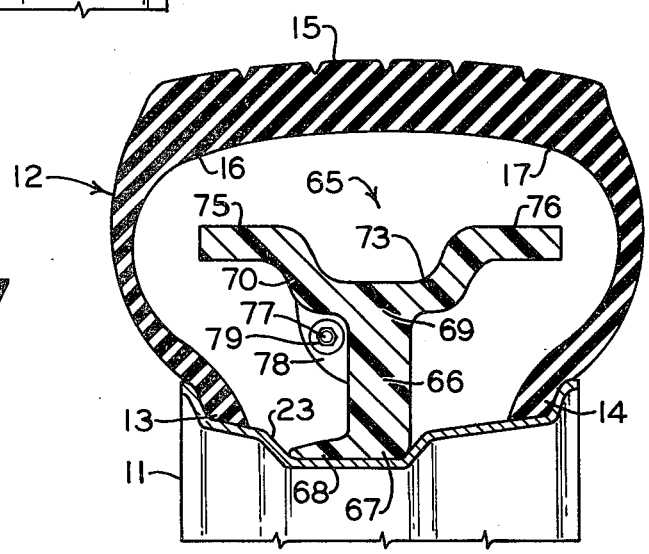
FIG. 7 is a schematic sectional view like FIG. 1 showing another modification of the safety support of the invention.

Another modification is shown in FIG. 7 and because the tire 12 and rim 11 are the same as that described for the embodiment of FIGS. 1 through 5, the same numerals designating the parts of the tire and rim will be used in describing this modification. A safety support assembly 65 has an annular central supporting member or web 66 with a radially inner edge 67 from which a mounting flange 68 extends axially for positioning in the wheel well 23. The mounting flange 68 has a width which is substantially the same as the width of the well 23 providing a close fit of the flange in the wheel well. The web 66 has a radially outer edge 69 with arm members 70 and 73 extending away from the web in opposite directions providing a safety support assembly 65 with a generally T-shaped cross section, as shown in FIG. 7.

Rings 75 and 76 are mounted on the ends of the arm members 70 and 73, respectively, and are located at spaced-apart positions for engagement by the tread portion 15 of tire 12 in the areas of the shoulder portions 16 and 17 during operation of the tire in the deflated condition. The rings 75 and 76 have a diameter less than the diameter of the tread portion 15 with the tire 12 in the inflated condition and a diameter greater than the diameter of the bead portions 13 and 14 of the tire. The assembly 65 may be made in halves in a manner similar to that shown and described for the embodiment of FIGS. 1 through 5. The halves may be connected by bolts 77 extending through lugs 78 on the assembly 65 and clamped together by nuts 79 threaded on the bolts.

The safety support assembly 65, rim 11 and tire 12 may be assembled and disassembled in the same manner described hereinabove for the embodiments of FIGS. 1 through 5 with special reference to FIGS. 3 through 5. Upon deflation of the tire 12, the tread portion 15 will be depressed into engagement with the rings 75 and 76 in the area of the shoulder portions 16 and 17. The arm members 70 and 73 will provide cushioning of the vehicle through deflection while at the same time providing the necessary support.

Figure 8:
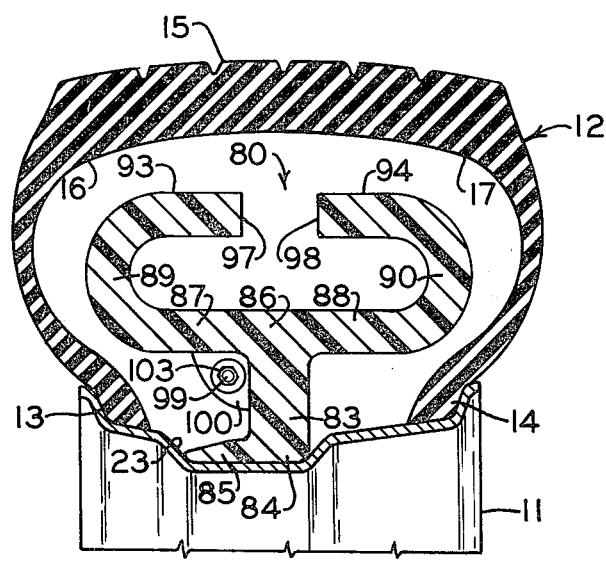
FIG. 8 is a schematic sectional view like FIG. 1 showing a further modification of the safety support of the invention.

A further modification is shown in FIG. 8 and the same identifying numerals will be used for the rim 11, tire 12 and parts thereof as were used for the embodiment of FIGS. 1 through 5. A safety support assembly 80 has an annular central supporting member or web 83 with a radially inner edge 84. A mounting flange 85 extends axially from the radially inner edge 84 and has a width substantially the same as the width of the wheel well 23 for seating engagement of the mounting flange in the well. The web 83 has a radially outer edge 86 with axially extending arm members 87 and 88 providing an assembly with a T-shaped cross section as shown in FIG. 8. Radially outward extending flanges 89 and 90 are provided at the distal ends of the arm members 87 and 88 and are connected in supporting relationship with rings 93 and 94.

The rings 93 and 94 are mounted on the flanges 89 and 90 at edges 95 and 96 each of which is at the greatest distance from the adjacent ring. The distal edges 97 and 98 of the rings 93 and 94 are spaced apart so that upon deflation of the tire 12, the tread portion 15 will engage the rings at areas of the shoulder portions 16 and 17. The diameter of the rings 93 and 94 is less than the diameter of the tread portion 15 of the tire 12 in the inflated condition so that during normal operation there will be no contact of the tread portion with the rings. The rings 93 and 94 also have a diameter greater than the diameter of the bead portions 13 and 14 of the tire 12. The safety support assembly 80 may be made in curved segments or halves in a manner similar to that described for the embodiment of FIGS. 1 through 5 and be clamped together at the ends of the segments by bolts 99 extending through lugs 100 at the ends of the halves and clamped by nuts 103 threaded on the bolts.

The assembly and disassembly of the safety support assembly 80, rim 11, and tire 12 may be performed in the same manner as described hereinabove for the embodiment of FIGS. 1 through 5 with special reference to FIGS. 3, 4 and 5. Upon deflation of the tire 12 the tread portion 15 will engage the rings 93 and 94 and the vehicle will be cushioned by deflection of the rings, the flanges 89 and 90, and the arm members 87 and 88 providing cushioning of the vehicle to withstand the impacts caused by irregularities in the road acting against the tread portion of the tire.

The arm members 35 and 36 shown in FIGS. 1–5, 56 and 57 shown in FIG. 6, 70 and 73 shown in FIG. 7, and 87 and 88 shown in FIG. 8 are of a fiberglass reinforced plastic or other material to provide radial deflection for cushioning the vehicle when the tire 12 is deflated and the tread portion 15 is in engagement with the respective rings 37 and 38, 58 and 59, 75 and 76, and 93 and 94. In accordance with this invention, the arm members may include rings or segmented sections of elastomeric material such as rubber to provide additional cushioning of the vehicle.

While certain representative embodiments and details have been shown for the purpose of illustrating the invention, it will be apparent to those skilled in the art that various changes and other modifications may be made therein without departing from the invention.

What is claimed is:

1. A safety support for use on a wheel rim for a pneumatic tire of the type having a tread portion, shoulder portions at the edges of said tread portion and bead portions for mounting the tire on said rim, said wheel rim having an annular well for positioning of said bead portions during mounting of said tire on said rim, comprising an annular central disc-like supporting member having a radially inner edge for mounting said support in said well, said inner edge having a relatively thin axially extending flange at one side of said supporting member with a width substantially equal to the width of said well less the width of said supporting member and not less than the width of one of said bead portions providing space at one side of said well for receiving one of said bead portions of the tire during mounting of the tire on said rim, a pair of supporting rings positioned at spaced-apart positions radially outward of said central supporting member and a pair of supporting arm members connecting said central supporting member and said rings, said rings having a diameter less than the diameter of said tread portion of the tire in the inflated condition and greater than the diameter of said bead portions for supporting engagement of said rings with said tire in the area of said shoulder portions in the deflated condition of said tire.

2. A safety support according to claim 1 divided into two curved segments for mounting on said rim and means for fastening said segments together to clamp said central supporting member around said rim and in said wheel well.

3. A safety support according to claim 1 wherein said arm members are of a resilient material, said arm members and central supporting member having a generally Y-shaped cross section and said supporting rings being mounted on the distal ends of the bifurcated arm members of said safety support.

4. A safety support according to claim 1 wherein said arm members are of a resilient material and curved generally about a circumferentially extending axis interposed between said rings providing a circumferentially extending channel with a generally semicircular cross section around said safety support.

* * * * *